United States Patent
Baumann

[19]

[11] Patent Number: 6,148,196
[45] Date of Patent: Nov. 14, 2000

[54] REMOTE CONTROL AND LOCATION SYSTEM

[75] Inventor: William John Baumann, Tempe, Ariz.

[73] Assignee: Motorola, Inc., Schaumburg, Ill.

[21] Appl. No.: 09/124,367

[22] Filed: Jul. 29, 1998

[51] Int. Cl.[7] .................................................. H04Q 7/20
[52] U.S. Cl. .................... 455/427; 455/11.1; 455/12.1; 455/13.1; 455/426; 455/430; 455/431
[58] Field of Search .................. 455/427, 428, 455/429, 430, 426, 431, 12.1, 13.1, 456, 457, 11.1

[56] References Cited

U.S. PATENT DOCUMENTS

| | | | |
|---|---|---|---|
| 5,119,504 | 6/1992 | Durboraw, III | 455/54.1 |
| 5,365,451 | 11/1994 | Wang et al. | 364/449 |
| 5,424,944 | 6/1995 | Kelly et al. | 364/401 |
| 5,528,232 | 6/1996 | Verma et al. | 340/825.54 |
| 5,563,607 | 10/1996 | Loomis et al. | 342/357 |
| 5,584,047 | 12/1996 | Tuck | 455/13.1 |
| 5,610,839 | 3/1997 | Karolak et al. | 364/514 C |
| 5,930,708 | 7/1999 | Stewart et al. | 455/428 |
| 6,047,160 | 4/2000 | Priest et al. | 455/11.1 |

*Primary Examiner*—Daniel S. Hunter
*Assistant Examiner*—Lana Le
*Attorney, Agent, or Firm*—Frank J. Bogacz

[57] ABSTRACT

A system for transmitting instructions from a master control facility (50) to a number of remotely located player units (11–14). The remotely located player units communicate through a mobile cell site (10). Cellular communication links (16) are provided to link the remote units (11–14) to cell site (10). Cell site (10) is linked to a satellite arrangement (20) via a communication link (21). The master control facility is linked to the satellite arrangement via communication link (23).

15 Claims, 3 Drawing Sheets

REMOTE CONTROL AND LOCATION SYSTEM

BACKGROUND OF THE INVENTION

The present invention pertains to communications systems and more particularly to remote control and location of elements in particular remote areas.

For monitoring and controlling elements and events from a remote area to a control center point-to-point fixed communications by wire line or radio frequency (RF) devices is employed. Data is often transmitted from the remote area to the control center where it is processed and displayed. Subsequently, commands for the elements or events may be transmitted back from the control center to the remote area via control devices on these point-to-point communications. Such conditions often required that control centers be located in proximity to the events and elements they were monitoring. Monitoring events and elements in many locations often required many control centers which may be linked through elaborate networks.

Examples of such systems with the above characteristics include military training ranges, prisoner monitoring, asset monitoring and police and fire coordination efforts. People participating in or controlling events or elements requiring monitoring for movement, etc. may include a communication device such as a radio for transmitting and receiving information from a control center or an RF activated device for monitoring the movement of elements.

The operation of such control centers are typically to gather information from sensors or personnel; process this information; and relay some command or activity back to the transmitting person or element. Often in fixed bounded areas it is highly desirable for the control center to know the location of the person or element to be instructed. For example, applying these requirements to the situations mentioned above may include the movement and monitoring of battle results for soldiers in a training range; location monitoring and control of prisoners; asset monitoring and management for transportation in warehouse operations; asset monitoring throughout movement; control of and coordination of police efforts at particular events and control of fire fighters in a coordinated effort to fight particular fires.

The greater the number of remote locations the control center has to monitor, the greater the problems of these communications. This is particularly true where events might happen worldwide and require common analysis and control.

Accordingly, it would be advantageous to have a common control center for monitoring, controlling and locating people and elements within particular bounded areas and provide a communication link for return instructions or commands.

DESCRIPTION OF THE PREFERRED EMBODIMENT

Figure 1:
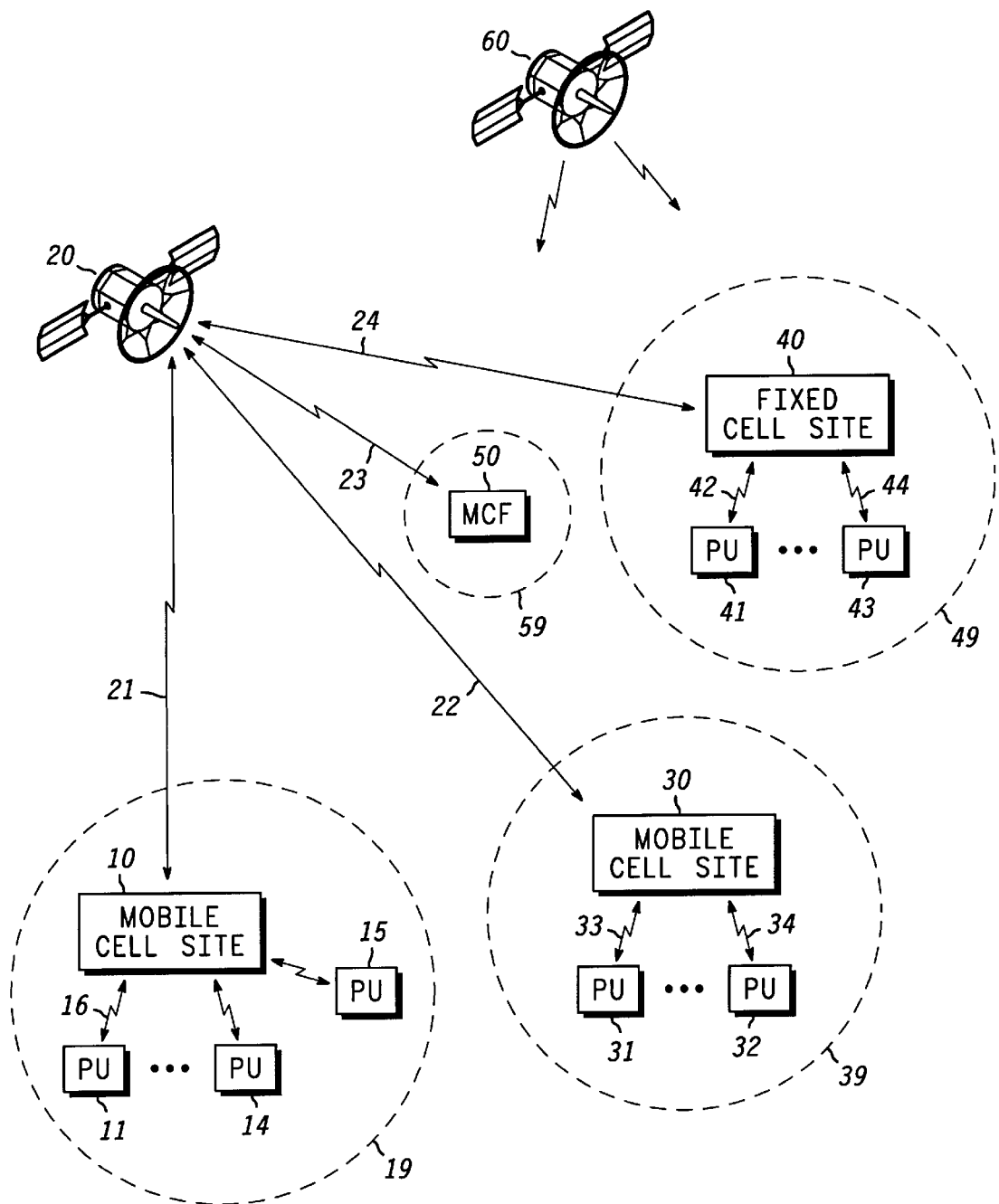
FIG. 1 is a block diagram of a remote control and location system in accordance with the present invention.

Referring to FIG. 1, a block diagram of a remote control and location system is shown. Several distinct geographic areas are shown 19, 39 and 49 and 59. Areas 19 and 39 include a mobile cell site 10 and 30 respectively. Area 49 includes a fixed cell site 40. A master control facility (MCF) 50 may be located in a completely different geographical area 59. The various areas 19, 39, 49 and 59 may be in various countries or geographical locations throughout the world. Satellite 20 provides the link between the mobile and fixed cell sites 10, 30 and 40 with the master control facility 50. Player units, participant units or package units (PU) 11–14, 15; 31–32; and 41, 43 are cellular units with real time location information, preferably from the global positioning system (GPS) 60.

The player units may be attached to soldiers in a training range exercise, fire fighters in a large geographical area such as a forest fire or police or security officers at large dispersed events such as the International Olympics, etc. Participant units may be attached to prisoners within secured facilities for monitoring their activities. Package units may be attached to stationary cargo containers or shipment loads or to mobile truck or train facilities for carrying cargo.

Satellite 20 may be an individual satellite or satellite system such as the IRIDIUM® system manufactured by Motorola, Inc. The satellite 20 or satellite system may be a low-earth orbiting satellite or satellite system, medium-earth orbiting or geostationary system. The satellite or satellite system 20 provides the communication link between the mobile cell sites 10, 30 and the master control facility 50. Up/down links 21, 22, 23 and 24 may be either RF (radio frequency) links or cellular links such as those supported by the Iridium® system.

To illustrate the workings of the mobile remote control and location system, an example of soldiers training on a range will be used. Area 19, for example, may be a particular geographic area or a mock battle for training purposes being staged. Area 39, may be a mock battle in a different country which is using the common master control facility to determine the outcome of the battle. Area 49 may be in another location which is dedicated to training facilities and therefore has a fixed cell site 40. Player units 41, 43 may be affixed to vehicles in this scenario.

Master control facility initiates the battle scenario by transmitting the message via satellite link 23 through the satellite or satellite system 20. This communication is in the nature of a cellular transmission which will be relayed through the satellite system 20 to downlink 21 to mobile cell site 10, for example. Mobile cell site 10 then transmits the mock battle scenario via cellular link 16 to each of the player units 11–14, 15. The mock battle in area 19 is then engaged with results being calculated by each of the player units 11–14 and 15 and positions being determined by each of the player units directly from the global positioning system 60. Individual player units 11–14, for example, determine whether as a result of the battle engagement, they were killed or injured or damaged. This information is then transmitted back from the player unit 11 through link 16 to the mobile cell site 10. Mobile cell site 10 may then transmit this information via satellite link 21 through satellite system 20 to satellite downlink 23 to the master control facility 50. Mobile cell site 10 may collect a number of player unit results and packetize these and transmit these via satellite links 21 and 23 and satellite system 20 to the master control facility 50.

Let's assume that area 19 is in the United States, for example. Area 39 may be located in a NATO (North Atlantic Treaty Organization) country such as Germany, for example. The German government may not wish to spend the expense of a master control facility located within their own country and therefore would be willing to use the master control facility 50 located within area 59 in the United States. Similar to the scenario described above for area 19, master control facility 50 will transmit mock battle information via satellite link 23 through satellite or satellite system 20 through satellite downlink 22 to mobile cell site 30. Mobile cell site 30 then transmits the battlefield scenario to player units 31–32. The player units may be attached to individual soldiers or vehicles, for example.

Player units 31–32 determine their position from the global positioning system 60 and determine whether they were injured or killed by munitions or fire in the mock battle and transmit their results via cellular links 33 and 34 respectively to mobile cell site 30. Mobile cell site 30 then packetizes or individually transmits the information via satellite link 22 through the satellite system 20 to satellite link 23 to the master control facility 50. The information is analyzed and the results determined by the master control facility 50.

Mobile cell sites 10 and 30 of areas 19 and 39 respectively, may be set up at any convenient training location since the cell sites are mobile. Mobile cell sites 10 and 30 may be loaded into a truck or van with suitable antennas and deployed wherever the military wishes to conduct a training exercise. This greatly increases the utility of the system over a fixed cell site such as cell site 40. Fixed cell site 40 must be dedicated only to the battlefield purposes whereas mobile cell sites 10 and 30 may be moved about and located wherever the military may wish to conduct their exercises. This provided a great advantage in fixed overhead and the reusability of training and land facilities of the respective governments. The remote control location system may also be used with fixed cell sites. Master control facility 50 transmits a mock battlefield scenario through satellite link 23 through satellite system 20 via satellite link 24 to fixed cell site 40. Fixed cell site 40 may be located on one of the dedicated training ranges which the U.S. Government or other governments may already have. Fixed cell site 40 transmits the battlefield information into player units 41, 43. Player units 41, 43 determine their location from the GPS system. Then player units 41, 43 determine the damage they may have sustained as a result of the battle or firing of artillery, mortar or other airborne weapons. Player units 41, 43 transmit this information via cellular links 42 and 44 respectively to fixed cell site 40. Fixed cell site 40 then transmits this information sequentially or in a packet form via satellite link 24 through satellite system 20, through link 23 to the master control facility 50 for analysis and reporting. Consecutive battlefield scenarios may be launched by master control facility to fixed cell site 40, for example, in response to particular outcomes of previously initiated mock battlefield scenarios.

As can be seen from the above description, this system provides the advantage of substantially reducing the amount of overhead and fixed facilities and infrastructure required for independent military training ranges. Furthermore, these training ranges may be established in any location and are moveable to different locations. A further extension might be to monitor actual battles in this manner. In addition, the system interfaces with the traditional fixed site military exercise areas.

The above system is also applicable to police and fire fighting efforts where coordination of and communication with individual officers and fire fighters is required from a central authority. This system is particularly useful where fire fighters and officers are spread over a large geographic area, but the need exists to have a coordinated effort among them.

The above system provides great benefits for use in asset management. For example, in warehouse operations including shipping containers or loads which are placed over a large geographic area, cellular units may be affixed to the shipping containers or loads and monitored from a central control facility (MCF) by mobile units in trucks or vans patrolling the area. Also, trains or trucks moving freight may be able to take advantage of such a system by employing fixed or mobile sites over a broad range of check points along predetermined routes.

In addition, such a system may be particularly useful for prisoner or inmate monitoring for location within the facility or in the event of an escape.

Figure 2:
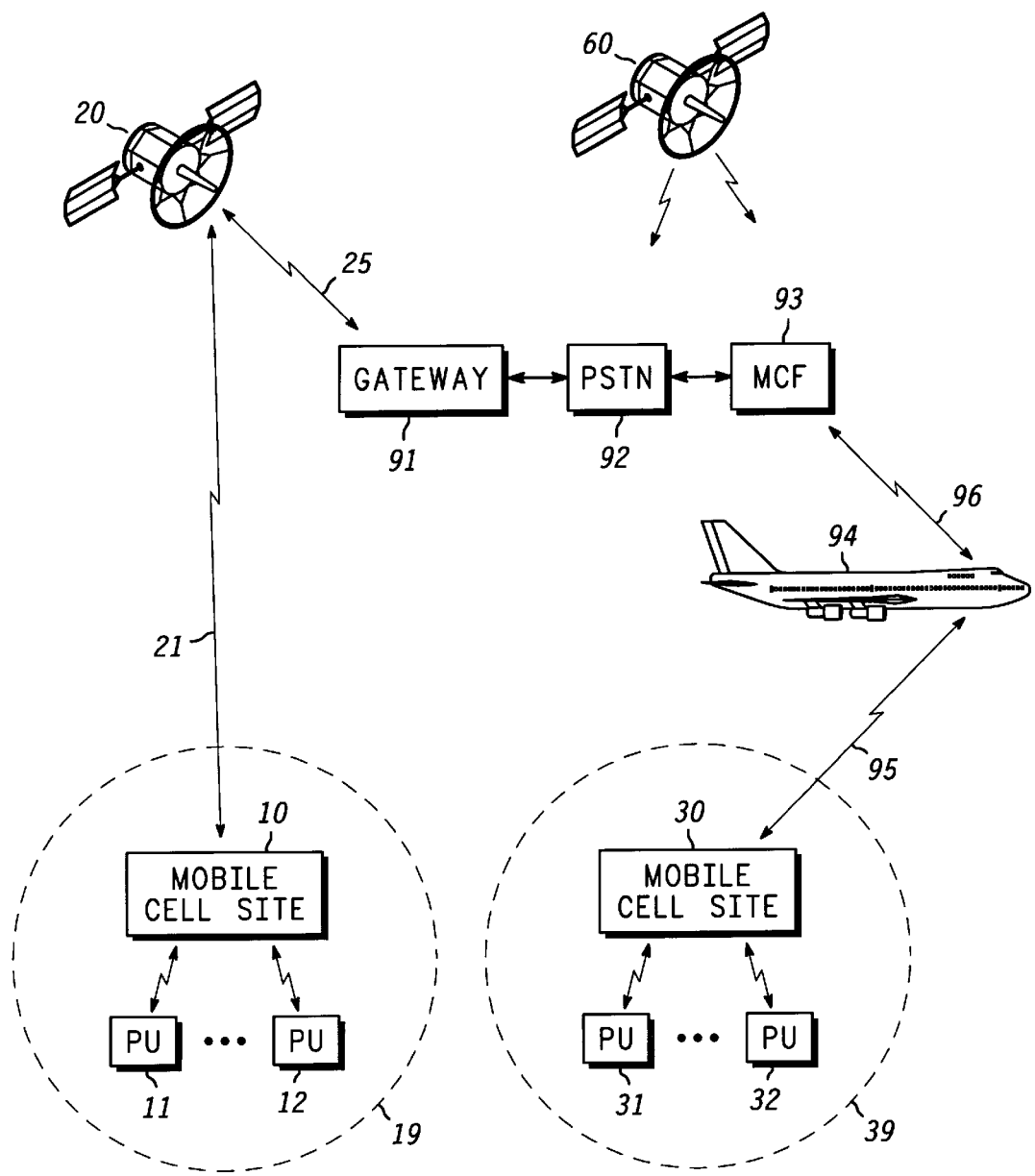
FIG. 2 is an alternate embodiment of a remote control and location system in accordance with the present invention.

Referring to FIG. 2, an alternate configuration of the remote control and location system is shown. Again, mobile cell site 10 is shown connected through satellite uplink 21 to satellite or satellite system 20. Player units 11–12 are cellularly coupled to mobile cell site 10. Satellite or satellite system 20 is now connected through satellite downlink 25 to a gateway 91. Gateway 91 allows the satellite system to interface with the public switch telephone network (PSTN) 92. The PSTN 92 is typically a terrestrial network. And it allows connection of the satellite system 20 to the main control facility 93. Main control facility 93 transmits the mock battlefield information through PSTN 92 and gateway 91 to satellite system 20 via satellite link 25. Satellite system 20 transmits the mock battlefield information via link 21 to mobile cell site 10. Mobile cell site 10 transmits the battlefield information to player units 11–12. Data gathered by the player units 11–12 is transmitted through mobile cell site 10 via link 21 to satellite system 20. Satellite system 20 transmits the information via link 25 through gateway 91 and the PSTN 92 to the main control facility 93 for analysis and reporting.

In another intra-connection arrangement, mobile cell site 30 would serve players units 31–32. Instead of mobile cell site 30 transmitting through a link to a satellite system, mobile cell site 30 transmits via a link 95 to a manned or unmanned aircraft 94 in the proximity of area 39 and the main control facility 93.

Aircraft 94 then transmits via link 96 the battlefield information to the main control facility 93. An aircraft 94 can provide for a quicker, low-cost relay link for short durations.

Again, these arrangements of the system provide for a highly mobile low-cost and less fixed infrastructure for military training exercises for each of the uses mentioned previously above. Only one main control facility is required to interact with control and monitor a number of remote mock battles or other events.

Figure 3:
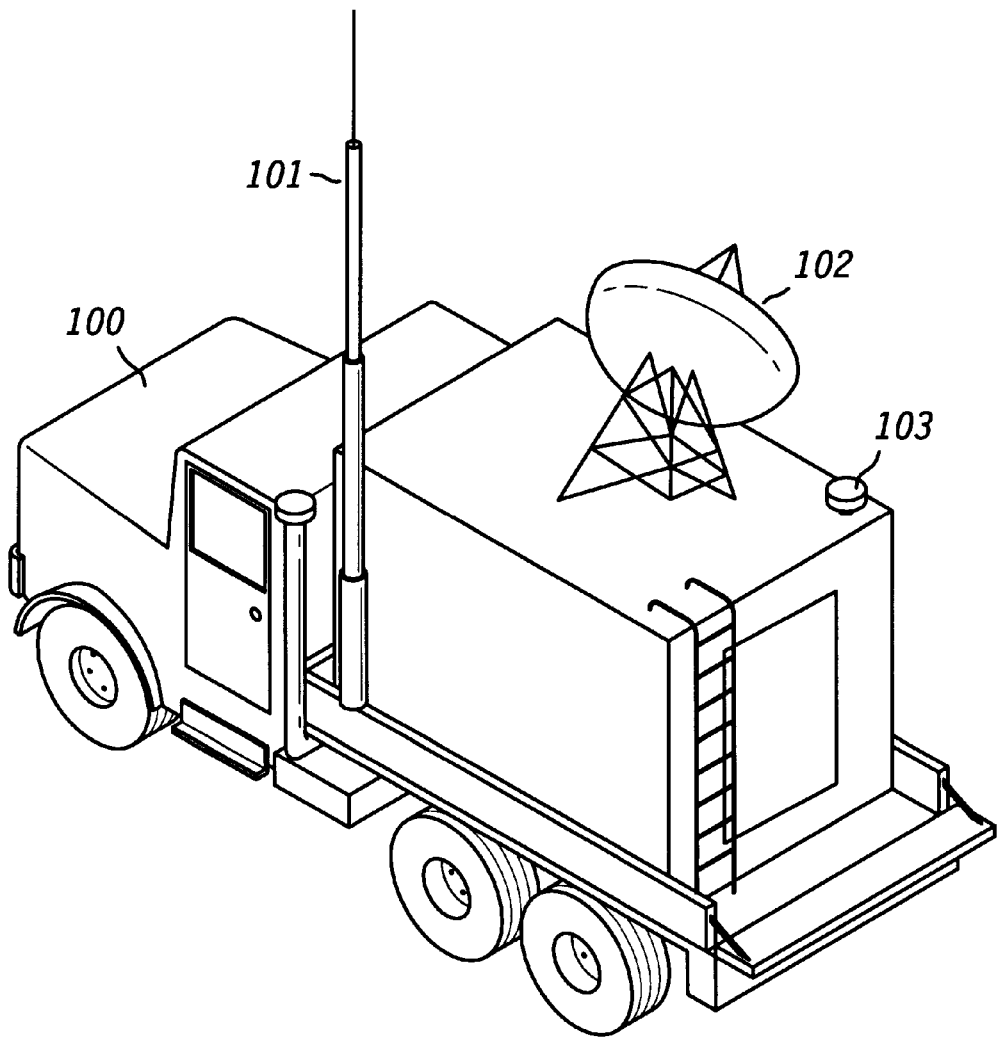
FIG. 3 is a diagram of a mobile control station for use in the remote control and location system in accordance with the present invention.

FIG. 3 depicts a mobile cell site. Vehicle 100 is a mobile cell site which may be readily moved about due to its nature of being a vehicle. Mobile cell site (vehicle as shown) 100 includes an antenna 102 for facilitating cellular transmissions between the cell site and the satellite or satellite system 20 as shown in FIGS. 1 and 2. The mobile cell site 100 also includes a cellular antenna 101 for communicating with each of the player units in the predefined specified geographic area as shown in FIGS. 1 and 2. Lastly, mobile cell site 100 includes a GPS antenna 103 for position determination. Mobile cell site 100 may include any moveable container large enough to store the equipment.

The mobile cell site also includes standard cellular base station communication equipment and satellite communication equipment, known to those skilled in the art, contained within the vehicle 100. This equipment may include RF equipment (voice/data transceivers, power amplifiers, low noise amplifiers, multiplexors/demultiplexors, modulator/demodulators, combiners, harmonic filters, power suppliers and scanning receivers), base station controller equipment (cell site controller, signaling channel controller and voice/data channel controllers) and data encoders.

The mobile cell site along with the satellite system for facilitating communication between the master control station and player units dispersed in a geographic area provides for low-cost highly and moveable and flexible communication infrastructure. Such a system will support a variety of uses including military training ranges, prisoner monitoring, asset management and monitoring and event and fire coordination efforts.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A remote control and location system comprising:
    a remote unit;
    a mobile cell site for transmitting to and receiving data from said remote unit, said mobile cell site being cellularly coupled to said remote unit;
    a satellite for receiving and transmitting said data, said satellite coupled to said mobile cell site;
    a master control facility for transmitting instructions to the remote unit and for analyzing said data returned by said remote unit, said master control facility coupled to said satellite;
    an aircraft for coupling said master control facility to said mobile cell site; and
    said mobile cell site includes a cellular communication facility mounted in a vehicle.

2. The remote control and location system as claimed in claim 1, wherein there is further included a global positioning system coupled to said remote unit, said global positioning system providing information for self-determination of location by said remote unit.

3. The remote control and location system as claimed in claim 2, wherein there is further included an RF link for coupling said global positioning system to said remote unit for self-determination by said remote unit of its location.

4. The remote control and location system as claimed in claim 1, wherein said satellite includes a satellite communication system.

5. The remote control and location system as claimed in claim 1, wherein there is further included a cellular communication link between said remote unit and said mobile cell site.

6. The remote control and location system as claimed in claim 1, wherein there is further included an RF link between said satellite and said mobile cell site.

7. The remote control and location system as claimed in claim 1, wherein there is further included a cellular communication link between said satellite and said mobile cell site.

8. The remote control and location system as claimed in claim 1, wherein there is further included an RF communication link between said satellite and said master control facility.

9. The remote control and location system as claimed in claim 1, wherein there is further included a cellular communication link between said satellite and said master control facility.

10. The remote control and location system as claimed in claim 1, wherein there is further included a fixed cell site for coupling said remote unit through said satellite to said master control facility.

11. The remote control and location system as claimed in claim 10, wherein said remote unit includes cellular communication means for coupling said remote unit to said fixed cell site.

12. The remote control and location system as claimed in claim 1, wherein there is further included:
    a gateway coupled to said satellite;
    a public switched telephone network coupled to said gateway; and
    said master control facility being coupled through public switched telephone network and said gateway for transmitting said data to said remote unit.

13. The remote control and location system as claimed in claim 1, wherein said remote unit includes communication means for coupling said remote unit to said mobile cell site.

14. The remote control and location system as claimed in claim 1, wherein there is further included a plurality of remote units coupled through said mobile cell site and said satellite to said master control facility.

15. The remote control and location system as claimed in claim 1, wherein there is further included a plurality of mobile cell sites coupled through said satellite to said master control facility.

* * * * *